(No Model.) 4 Sheets—Sheet 1.

R. C. FORSYTH.
TRUCK FOR SUSPENDED CARS.

No. 449,318. Patented Mar. 31, 1891.

Witnesses:
Jean Elliott
Julia Usler

Inventor
R. Clarke Forsyth
By Burton & Burton
his Attorneys (No Model.) 4 Sheets—Sheet 2.

R. C. FORSYTH.
TRUCK FOR SUSPENDED CARS.

No. 449,318. Patented Mar. 31, 1891.

Witnesses.
Jean Elliott.
Julia Osler.

Inventor
R. Clarke Forsyth
By Burton and Burton
Attorney.

THE NORRIS PETERS CO., PHOTO-LITHO., WASHINGTON, D. C.

(No Model.) 4 Sheets—Sheet 3.
R. C. FORSYTH.
TRUCK FOR SUSPENDED CARS.
No. 449,318. Patented Mar. 31, 1891.
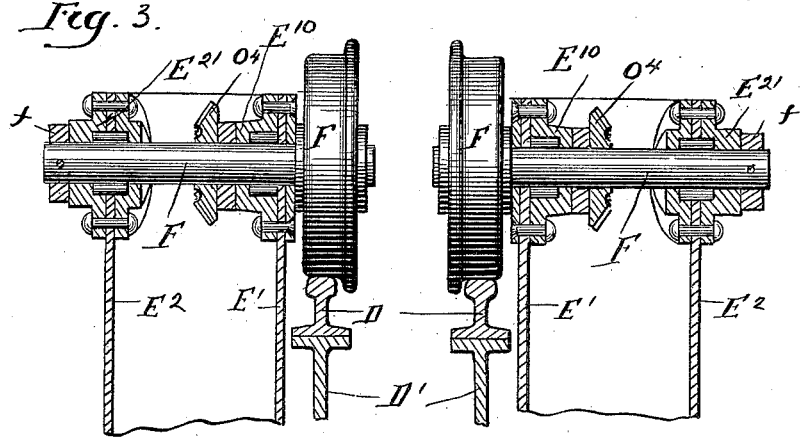
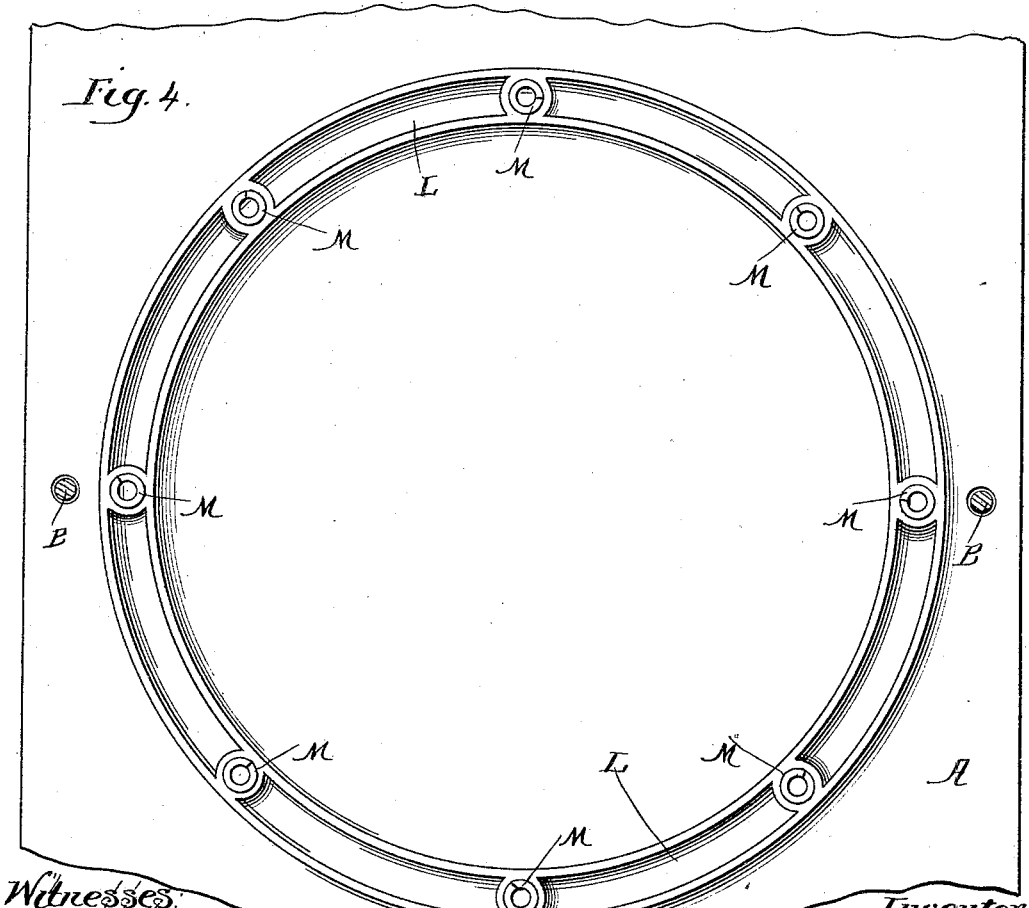
Witnesses:
Jean Elliott.
Julia Usler.
Inventor
R. Clarke Forsyth
By Burton and Burton
His Attorneys

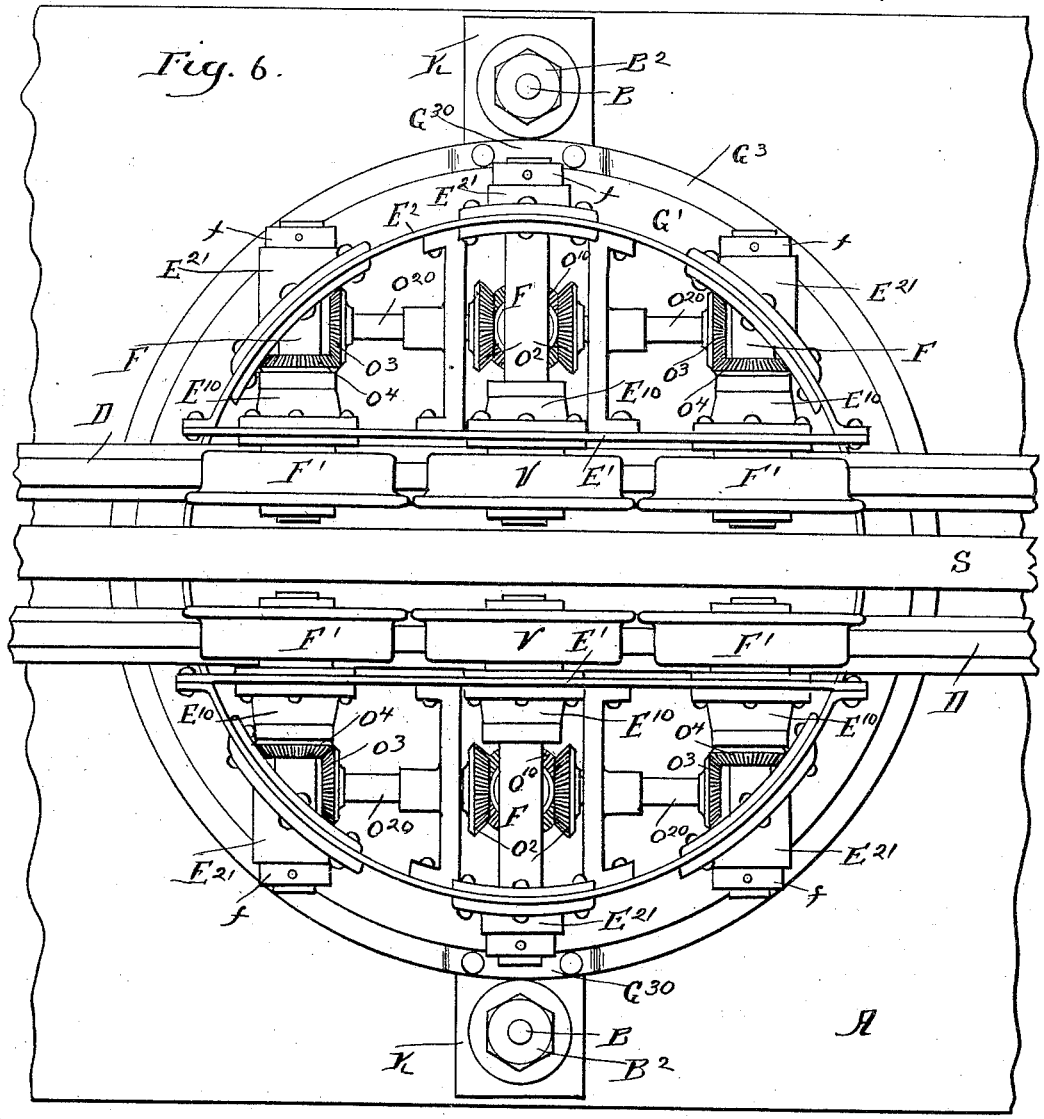

UNITED STATES PATENT OFFICE.

ROBERT CLARKE FORSYTH, OF CHICAGO, ILLINOIS.

TRUCK FOR SUSPENDED CARS.

SPECIFICATION forming part of Letters Patent No. 449,318, dated March 31, 1891.

Application filed December 26, 1890. Serial No. 375,766. (No model.)

*To all whom it may concern:*

Be it known that I, ROBERT CLARKE FORSYTH, a citizen of the United States, residing at Chicago, county of Cook, and State of Illinois, have invented certain new and useful Improvements in a Truck for Suspended Cars, which are fully set forth in the following specification, reference being had to the accompanying drawings, forming a part thereof.

The purpose of this invention is to provide a truck adapted to be employed with a car running suspended from an overhead track, such truck being adapted to be placed above the car.

I design this truck to be used in connection with the elevated-railway track and car patented to me July 17, 1888, numbered 386,120.

The specific purposes which I aim to accomplish by this invention are to permit a car to pass around short curves in the track readily and with the least possible loss of power; also, to prevent the swinging or swaying of the car from causing the drive-wheels to leave the track so as to lose their grip by traction thereon and to permit the speed of the driving-wheels on the opposite sides to vary, as required, by the shortening of the inner rail on short curves, and to relieve the car from shocks due to irregularities in the track or in either rail, and to prevent such irregularities in one rail from effecting the traction of the wheel on the other rail; also, the form of the trucks is designed to afford to the drive-wheel axles very great resistance against longitudinal movement, which might be induced by the sideward swaying of the car or by the momentum of the truck and wheels themselves at points of curvature in the track.

Figure 1:
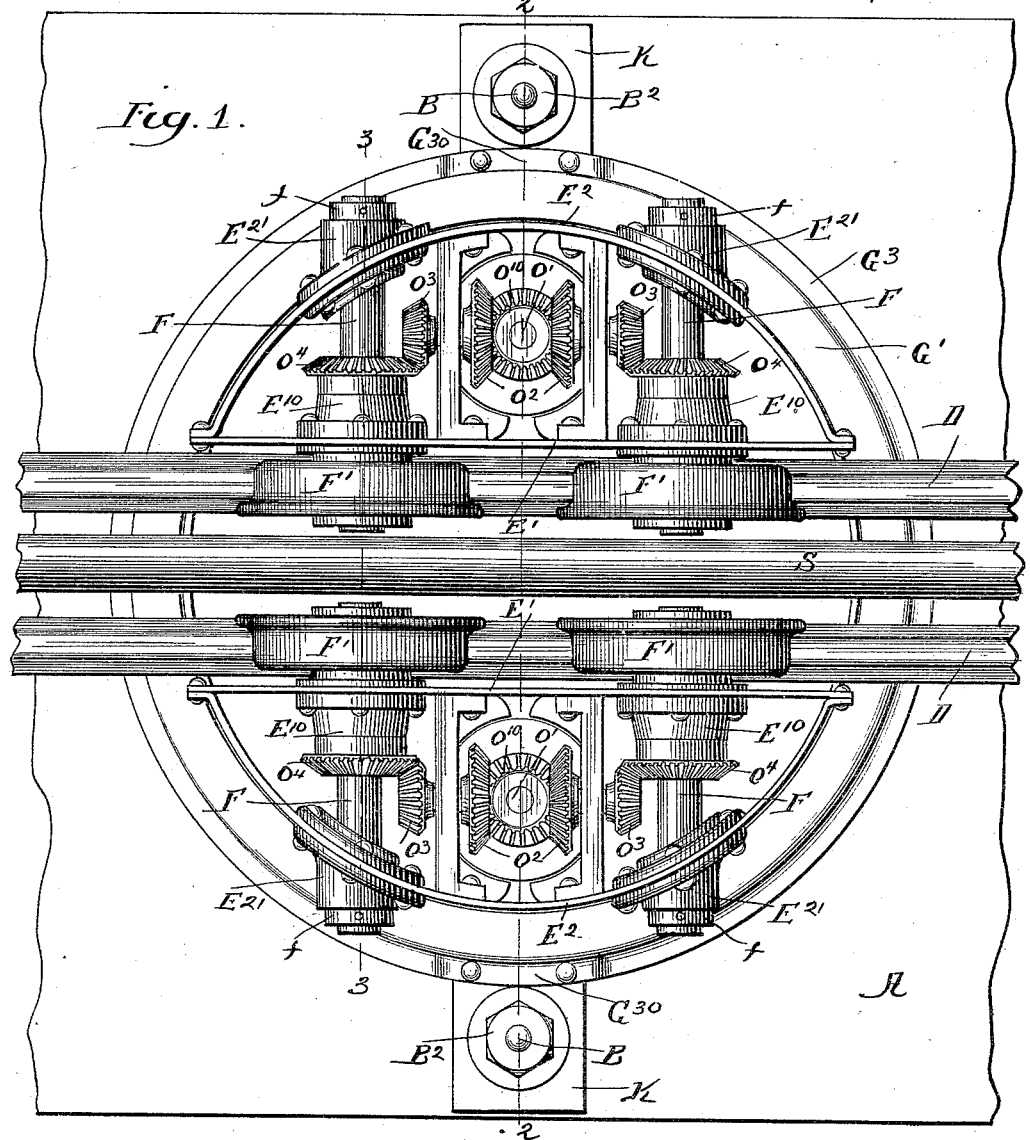
Figure 5:
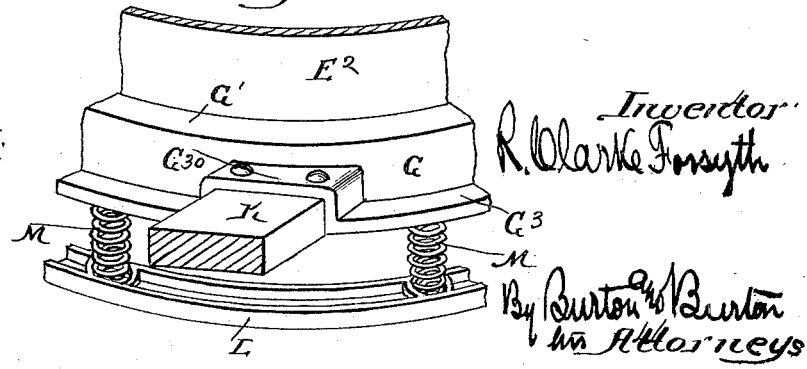
Figure 2:
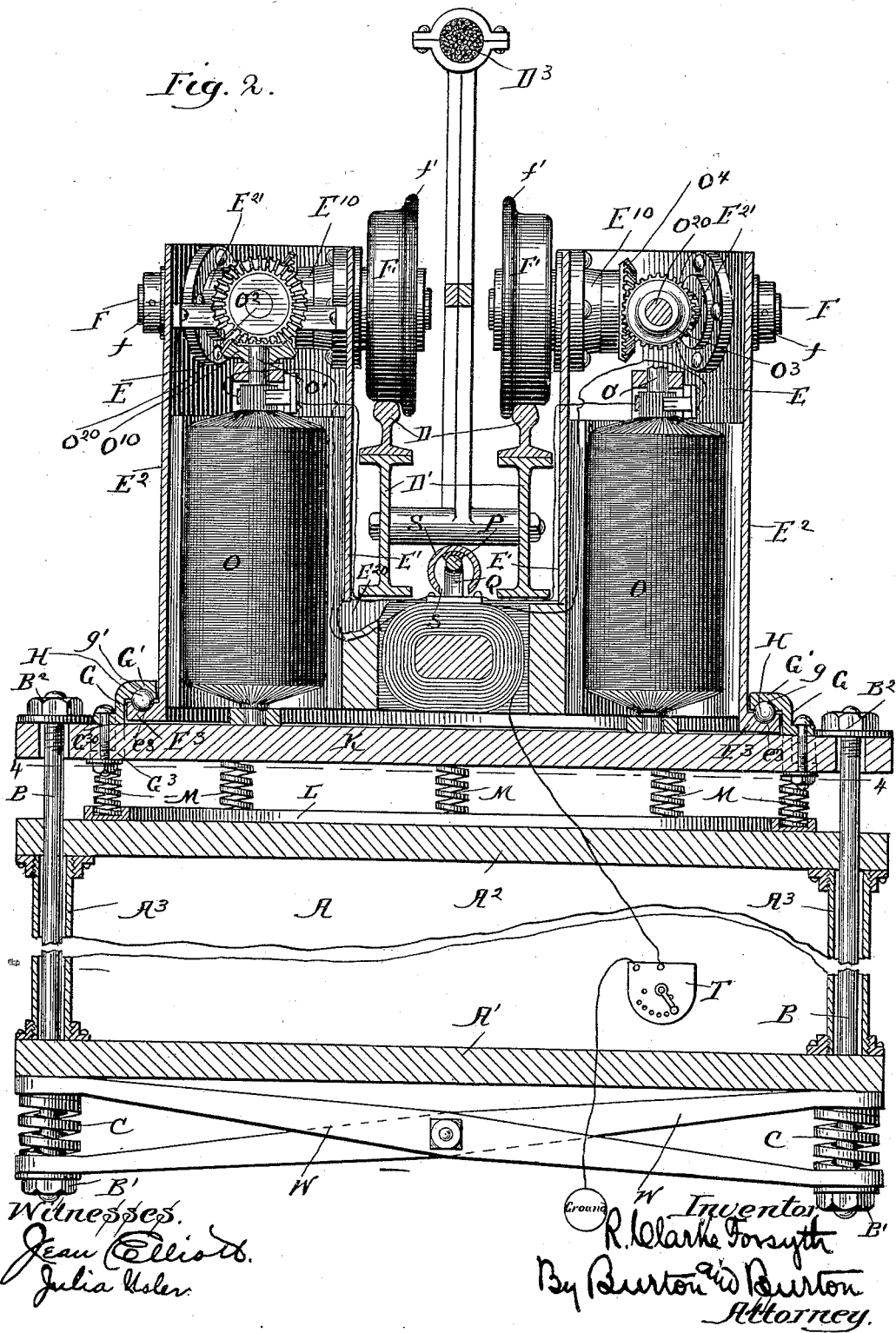

In the drawings, Figure 1 is a plan of my improved truck and of the portion of the track and car seen beneath it. Fig. 2 is a vertical section at the line 2 2 on Fig. 1, the section extending down through the car, which is broken away at the middle part. Fig. 3 is a section at the line 3 3 on Fig. 2, through the axis of one pair of wheels, the section including only so much as is necessary to show the bearings of the axles. Fig. 4 is a section at the line 4 4 on Fig. 2. Fig. 5 is a view of a detail. Fig. 6 shows the invention embodied in a six-wheel truck.

A represents the car, of which A' is the cross-sill at the bottom, and may represent any base frame-work necessary for proper strength. In like manner $A^2$ represents a cross-beam at the top of the car, which may represent any suitable frame-work at the top necessary to endure the strain of the operation hereinafter described.

$A^3$ $A^3$ are vertical tubular posts, which are designed to be inclosed in the walls of the car and to constitute a rigid connection between the lower sill A' and the upper beam $A^2$—that is to say, in general, between the upper and lower frame-work. I prefer for this purpose precisely what is shown—that is, a tube; but in general the posts $A^3$ $A^3$ may represent any rigid connection between the top and bottom frame-work.

B B are rods which extend through the wall of the car from top to bottom, which, when tubular posts $A^3$ $A^3$ are employed, may conveniently be extended within such posts.

Extending transversely underneath the car are the two equalizing-levers W W, which are connected together at their middle point by a horizontal pivot, one end of one of the levers resting against the bottom of the car at one side, while the opposite end of the other lever is similarly situated at the other side of the car. The other ends of the levers respectively are connected to the lower ends of the rods B B, respectively. C C are springs which react between said levers, tending to spread them vertically at their ends—that is, tending to force the ends which rest against the bottom of the car upward relatively to the ends which are connected to the ends of the rods B B. The connection of the rods to the levers may be merely that the rods are provided with stop-shoulders, heads, or nuts B', which engage underneath the ends of the levers W, because, all the weight of the car operating downward upon the levers, a connection between the levers and the rods which will resist the downward pressure upon the levers is all that is required. The rods B extend up above the car, and by them the car is suspended, in a manner hereinafter explained, upon the truck or parts immediately connected therewith, the truck being in turn suspended from the rails by means of the drive-wheels journaled in it, as also hereinafter set forth.

D D are the rails which are mounted upon the upper edges of the beams D' D', which are suitably tied together and trussed and suspended from the cable D³, the suspension-rods extending down from the cable between said rails and beams. This construction is fully set forth in my said patent, No. 386,120, dated July 17, 1888, and need not be further explained in detail here.

The truck comprises the two bearing-pillars E E, which are located at the opposite or remote sides of the track, which comprises the rails and the beams D D', both of which are therefore between the said pillars. These two pillars are rigidly connected underneath the track—that is, below the beams—as will appear from the hereinafter contained detail description of their construction. At the upper part of these pillars are formed the bearings for the drive-wheel axles F F F F, at the inner ends of which—that is, facing each other in pairs between the pillars and overhanging the rails on which they respectively ride—are the drive-wheels F' F' F' F'. Before proceeding with the description of the remaining parts which connect the pillars to the car, I will describe these pillars in detail. They are each in the form of a segment of a cylinder, the flat sides of said segments facing each other on the opposite sides of the track, their convex sides with their curvature horizontal being preferably coincident with the same circle at opposite sides thereof—that is to say, in the position relatively to each other which they would occupy in the complete cylinder of which they are both segments; and, in fact, the outer or convex wall of these pillars is continuous throughout the entire circumference at the lower part for a short portion of the height, and constitutes the connection between the two segments, making them rigid with each other. These segments may conveniently be made of heavy rolled or cast metal plate formed in proper shape and bolted together.

E' E' are the inner plates or walls of the segments, respectively; E² E², the outer convex walls of said segments, E²⁰ E²⁰ being the connecting-necks between the two convex walls at their lower ends. The space within the walls of the pillars respectively is occupied by a motor and driving-connections therefrom to the drive-wheel axles F F, &c., respectively, two or more of which are journaled in each of the pillars, a journal-box E¹⁰ being provided for each axle on the inner or flat side of the pillar and a journal-box E²¹ E²¹ being provided on the convex side. The wheels are pinned fast to the axles on the exterior of the pillars at their inner face—that is, their facing sides—and the flanges f' of the wheels are at their inner edges—that is, on the opposite side of the rails, respectively, from the pillars—so that the engagement of the flanges with the rails prevents the wheels of each pair from separating unless they jump the track, which is prevented by the cross-necks E²⁰, which connect the opposite pillars. These necks extend underneath the beams of the track so near to the lower edges of the latter that the vertical movement which would be possible before the cross-necks would be arrested by the beams is less than the width of the flanges of the wheels. The axles F extend through the outer walls E² of the pillars and project beyond their journal-boxes E²¹ E²¹ far enough to be provided each with a step-nut or collar f, which prevents the inward longitudinal movement of the axles, and therefore of the wheels. The wheel-flanges f' preventing the outward movement with respect to the rails, and the hubs of the wheels abutting against the inner ends of the journal-boxes E¹⁰ E¹⁰, preventing longitudinal movement outward with respect to the pillars, and the stops f preventing longitudinal movement inward with respect to the pillars, the axle and wheels become a means of holding the pillars inward—that is, against spreading—making available for that purpose the entire strength of the ties which connect the two rails and prevent their spreading—that is, the two pillars cannot spread unless the rails spread or the wheel-flanges break. It will be observed that any strain tending to spread the pillars will, in view of the resistance afforded by the rails against the wheel-flanges, be experienced as a pressure tending to crush horizontally the pillars—that is, to break in the convex wall where the stop-nut or collar f bears against the journal-box E²¹. It is in order to afford the greatest possible strength and rigidity to resist this tendency that I prefer to make the pillars outwardly convex—that is, segments of a cylinder, as shown—because by this means I get the strength of an arch to resist this crushing pressure and give lateral fixedness—that is, freedom from lateral movement—to the pillars, or, what is the same thing, to prevent longitudinal movement of the axles with respect to the journal-bearings.

The pillars E E are provided at the lower edge of their outer wall with the outwardly-projecting horizontal flange E³, which extends also around the cross-necks E²⁰, which, as above stated, are but the continuation of the said outer walls at their lower part. This flange E³ is for the purpose of affording lodgment for or engagement with a corresponding flange or overhanging lip, which is provided upon a part connected to the car, so that the car may by the engagement of such lips or flanges be suspended from the pillars.

G is an annulus of metal rabbeted on the under side, so that it becomes angular in cross-section with the horizontal flange G', which overhangs the flange E³ on the pillars, said flanges occupying the rabbet in said annulus. The flanges G' and E³ have corresponding grooves $g'$ and $e^3$, facing each other and together constituting the channel or seat for anti-friction balls H, which are interposed between said flanges in said grooves to prevent rubbing friction between the flanges as the annulus G makes partial revolutions about the pillars in the operation of the structure, as hereinafter set forth. The annulus G has the exterior annular flange $G^3$ at the lower edge, and formed in said lower edge at diametrically-opposite points the seats $G^{30}$ for the cross-beam K, which is let up into said seats, so that its lower edge is about flush with the lower face of the flange $G^3$. The cross-beam is bolted fast in said seats and thus made rigid with the annulus G. It will be observed that the latter extends vertically below the lower edge of the pillars E as far as the thickness or vertical dimension of the cross-beam K, so that the rotation of the cross-beam K with the annulus G about the pillars is unobstructed by said pillars. This cross-beam extends laterally substantially the full width of the car, and near its end it receives the rods B, which protrude up through said cross-beam, one at each end, and are provided with cross-heads $B^2$ above the beam, so that the rods and car are suspended thus from the beam K, which is secured to the annulus G, said annulus being suspended from the pillars E E by the engagement of its flange $G^2$ above the horizontal flange of the pillars.

It will be observed that the weight of the car is experienced directly by the springs C C. In order to control the vertical oscillation of the car, I prefer to provide it with buffer-springs on top, which shall react between the car and the support from which the car-supporting rods hang—viz., the beam K—and in order that neither the endwise or sidewise oscillation of the car shall be communicated to the trucks I prefer to interpose the buffer-springs in a circle around the axis of the trucks. For this purpose I secure to the top of the car the annulus L, of diameter equal to the annular flange $G^3$, and at intervals in the circumference of said annulus I provide sockets, in which are seated spiral springs M. Corresponding sockets are provided in the lower face of the flange $G^3$, and thereby both ends of the springs are retained, and the springs, reacting between the car below and the annulus above, tending, therefore, to check the upward movement of the car, which might arise from reaction of the springs C. The car is thus suspended between the springs C below and M above and cushioned in both directions. The rods B hang loosely in the beam K, so that slight endwise or sidewise oscillation of the car with respect to the beam is not prevented; but the buffer-springs M tend to check such oscillation in all directions, permitting it to such moderate extent as will not cause the trucks thereby to be lifted at either side or end from the rails. In like manner any irregularity in the track, which might cause one wheel or the wheels on one side to be lifted slightly more than the others as the trucks run on the track, and which would, therefore, tend to cause the car to oscillate longitudinally or transversely, will produce only the movement of the truck, the springs L yielding underneath the wheel or wheels thus lifted and preventing the oscillation from being communicated to the car.

I prefer to provide motive power for the wheels on each side of each truck independently of the wheels on the other side—that is, so that the speed of the one will not be directly dependent upon the speed of the other, and for this purpose I locate in each of the pillars E a motor for the wheels whose axles are journaled in that pillar. I prefer to operate the railway for which these trucks are designed by electricity, and therefore provide an electric motor O in each of the pillars and communicate motion from such motor to each of the axles F. The detail construction of the communicating mechanism may be varied indefinitely, and I do not confine myself to any particular mechanism shown, nor to any particular kind of motor.

O represents (conventionally only) an electric motor whose main shaft $O'$ is provided with a bevel-gear $O^{10}$, which meshes with bevel-gears $O^2$ $O^2$ on the horizontal shafts $O^{20}$ $O^{20}$, at whose opposite ends are the bevel-gears $O^3$ $O^3$, which mesh with the gears $O^4$ $O^4$ on the axles F F, respectively, and thereby communicate equal rotary motion to said axles. I take the electric current for the motor O from an electric conducting-wire P by means of a trolley Q. The wire P is supported in the slotted tube S, wherein it is properly insulated, said tube being supported between the beams of the track having the slot $s$ in its lower side through which the trolley projects to contact the wire P. The current communicated through the trolley reaches the motor through a suitable regulating and switching device, which is conventionally represented at T, conveniently located in the car, whereby the same is brought under the control of the operator. The devices for this purpose do not form a part of this invention, but may be such as are commonly employed in electric cars, taking their operating current by means of a trolley from a motor-circuit.

It may be desirable in some cases to provide a third pair of wheels V V for each truck, as safety-wheels—that is, to take the weight of the car in case of any accident to the driving-wheels or axles. These wheels should not be driving-wheels—that is, they should not be connected to the driving-motor. Their axle-bearings are provided in the pillars in the same manner as the axle-bearings of the driving-wheels.

I claim—

1. In an overhead truck for a suspended car, the upright axle-pillars located at the opposite or remote sides of the track and extending up past the same, the wheel-axles journaled in said pillars, and the wheels at the inner ends of the axles, respectively, between the pillars and overhanging the rails, substantially as set forth.

2. In an overhead truck for a suspended car, upright axle-pillars located at the opposite or remote sides of the track and extending up past the same, the wheel-axles journaled in said pillars, the wheels at the inner ends of the axles between the pillars overhanging the rails and provided with flanges at their edges remote from the pillars, respectively, substantially as set forth.

3. In an overhead truck for a suspended car, axle-pillars located at opposite or remote sides of the track and connected together by a rigid cross-neck below the track and extending up past the track, the wheel-axle journaled in said pillars, and the wheels at the inner ends of the axles between the pillars overhanging the rails and provided with flanges at their edges remote from the pillars, respectively, the width of said flanges being greater than the vertical play between the cross-neck and the under side of the track, whereby the wheels are prevented from jumping the track, substantially as set forth.

4. In an overhead truck for a suspended car, the upright axle-pillars located at the opposite or remote sides of the track and extending up past the same, said pillars being in the form of cylindrical segments with their bases facing each other, the axles journaled in said pillars, respectively, transversely to the segmental bases and having the wheels at their inner ends between such bases and provided with stops outside the pillars at the opposite ends from the wheels, whereby lateral movement of the car tending to cause longitudinal movement of the axles with respect to the pillars is resisted by the horizontally-arched walls of the pillars, substantially as set forth.

5. In an overhead truck for a suspended car, the upright axle-pillars located at the opposite or remote sides of the track and extending up past the same, said pillars being in the form of segments of a vertical cylinder and having their bases facing each other, the wheel-axles journaled in said pillars transversely to said bases and having stops outside the pillars against the base and curved side, respectively, whereby longitudinal movement of the axles in said pillars is prevented, the wheels at the inner side of said axles between the bases of the pillars overhanging the track and provided with flanges on their edges remote from their pillars, respectively, substantially as set forth.

6. In combination with the axle-supporting pillars, the axles journaled therein at the upper part having the wheels at their inner ends between the pillars in position to overhang the track, and having at the lower end an annular flange projecting horizontally, an annulus having a flange which overhangs said annular flange of the pillars, said flanges having corresponding annular grooves in their surfaces facing each other, and balls located in said grooves constituting rolling-bearings between said flanges, and the car suspended from said annulus, substantially as set forth.

7. In combination with the truck, the rods B, suspended therefrom, the springs C, suspended on the lower ends of the rods, the car supported by said springs, and the buffer-springs M M, interposed between the top of the car and the truck, substantially as set forth.

8. In combination with the truck, the rods B, suspended therefrom loosely, springs C, suspended on the lower ends of the rods, the car supported by the springs, the springs M M, arranged in a circle about the vertical axis of the truck and interposed between said truck and the top of the car, substantially as set forth.

In testimony whereof I have hereunto set my hand, at Chicago, Illinois, this 20th day of December, 1890, in the presence of two witnesses.

R. CLARKE FORSYTH.

Witnesses:
CHAS. S. BURTON,
JEAN ELLIOTT.